United States Patent [19]
Muratomi

[11] Patent Number: 5,270,889
[45] Date of Patent: Dec. 14, 1993

[54] MAGNETIC HEAD SLIDER AND SUPPORT MECHANISM THEREFOR

[75] Inventor: Yoichi Muratomi, Hyogo, Japan

[73] Assignee: Mitsubishi Denki Kabushiki Kaisha, Tokyo, Japan

[21] Appl. No.: 762,861

[22] Filed: Sep. 18, 1991

[30] Foreign Application Priority Data

Sep. 21, 1990 [JP] Japan .................................. 2-252487

[51] Int. Cl.$^5$ .............................................. G11B 5/60
[52] U.S. Cl. ..................................... 360/103; 360/102
[58] Field of Search ....................... 360/103, 102, 104

[56] References Cited

U.S. PATENT DOCUMENTS

| | | | |
|---|---|---|---|
| 4,700,248 | 10/1987 | Coughlin et al. | 360/103 |
| 4,996,614 | 2/1991 | Okutsu | 360/103 |
| 5,079,657 | 1/1992 | Aronoff et al. | 360/103 |
| 5,107,384 | 4/1990 | Mitsuhashi | 360/104 |

FOREIGN PATENT DOCUMENTS 194563 4/1989 Japan .
5815866 2/1991 Japan .

OTHER PUBLICATIONS

A. Burgdorfer, "The Influence of the Molecular Mean Free Path on the Performance of Hydrodynamic Gas Lubricated Bearings," Transaction of the ASME, Journal of Tribology, Jul. 1989, vol. 111, pp. 495-503.

*Primary Examiner*—Paul M. Dzierzynski
*Assistant Examiner*—Richard Hanig
*Attorney, Agent, or Firm*—Wolf, Greenfield & Sacks

[57] ABSTRACT

A magnetic head slider is disclosed, of which a surface in frictional contact with a magnetic recording medium has different shapes adjacent to air stream inlet and outlet ends such that mean gap with respect to the magnetic recording medium is smaller adjacent to the air stream inlet end than adjacent to the air stream outlet end. When performing recording or reproduction, the magnetic recording medium is sucked to be in contact with the magnetic head slider by a negative pressure generated with relative movement of the magnetic recording medium and magnetic head slider.

19 Claims, 10 Drawing Sheets a: A COARSE SURFACE PORTION OR A LOW LEVEL SURFACE PORTION

FIG.8(g)　　FIG.8(h)　　FIG.8(i)
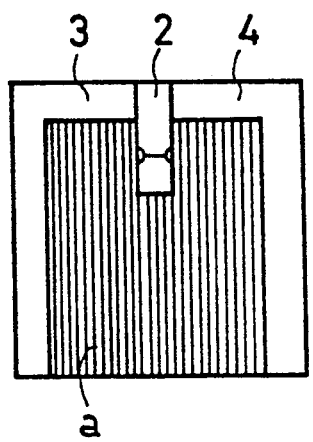
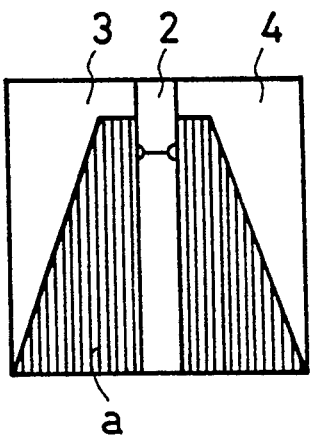
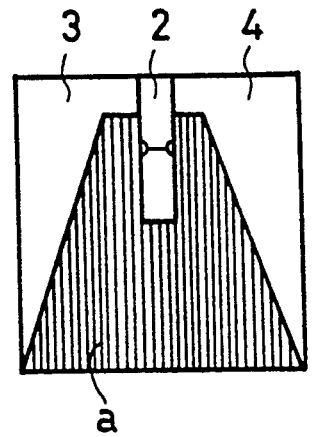
FIG.8(j)
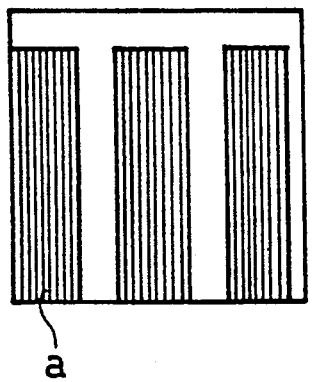

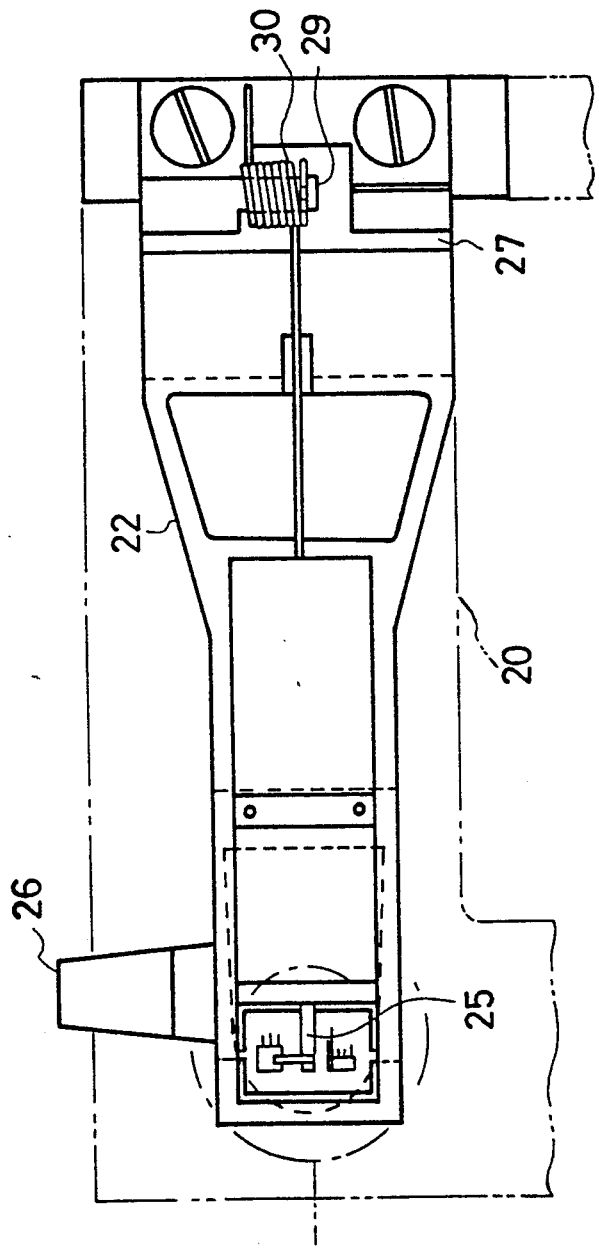
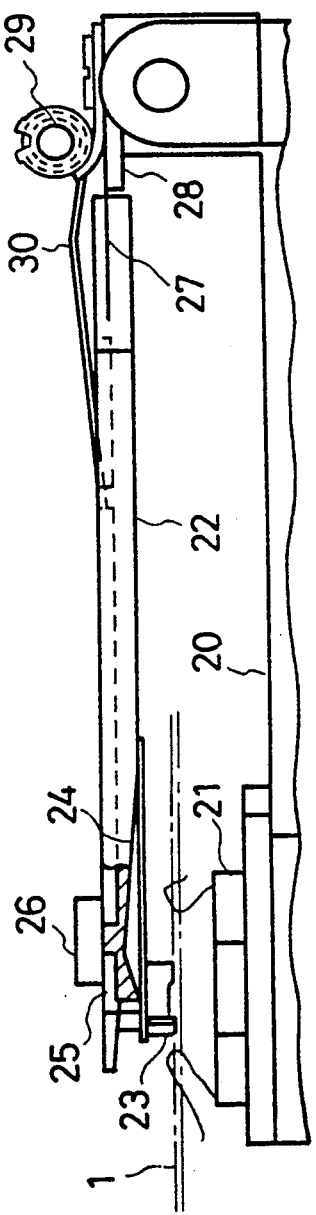
FIG. 9 PRIOR ART
FIG. 10 PRIOR ART

MAGNETIC HEAD SLIDER AND SUPPORT MECHANISM THEREFOR

BACKGROUND OF THE INVENTION

1. Field of the Invention

This invention relates to recording apparatuses used with flexible media and, more particularly, to a magnetic head slider and a support mechanism therefor, used for flexible magnetic disk apparatuses, electronic still image recording apparatuses, video tape recorders, etc.

2. Description of the Prior Art

Up to date, a flexible magnetic disk apparatus disclosed in Japanese Patent Publication No. 58-15866 has been widely used. The construction and operation of this apparatus will be described with reference to a plan view of FIG. 9 and a partly sectional side view of FIG. 10. Referring to these Figures, designated at 1 is a magnetic disk, and at 20 a carrier. A stationary converter 21 of a well-known button head type is mounted on carrier 20 at a free end thereof. The converter 21 is set such that it slightly wedges into a principal surface of disk 1. Canti-lever type load arm 22, which has small mass and comparatively high mechanical strength, is pivoted to the end of carrier 20 remote from converter 21. It has a small hole formed near its free end, and magnetic head slider 23 is provided in the hole. Magnetic head slider 23 is attached to an end of a short two-axis gimbal spring 24. It has a bottom attached to and extending along arm 22 and radially spaced apart from the magnetic head slider Designated at 25 is a pivot extending from a position of arm 22 near the free end thereof and through the hole to keep a central portion of magnetic head slider 23. Control knob 26 is provided on arm 22 near the free end thereof. It can be engaged with a solenoid operation member (not shown) for rotating arm 22 in directions for engaging and disengaging the magnetic head with and from magnetic disk 1. Arm 22 has its lower end connected by the agency of light leaf spring 27 to an end of carrier 20. The rotation noted above is caused by this spring. Spring 27 engages in a position with head stopper 28 to restrict motion of the head toward stationary converter 21. Nar an end of a rotational shaft of arm 22, cylindrical core member 29 is connected to carrier 20. Torsion spring 30 is wound on the core member and has a straight end portion extending along the body of arm 22 to exert a spring load to arm 22 toward stationary converter 21.

In operation, when recording or reproducing data, the solenoid operation mechanism (not shown) engaging with control knob 26 on arm 22 is energized to let torsion spring 30 urge magnetic head slider 23 against the surface of magnetic disk 1. Magnetic disk 1 thus is sandwiched between stationary converter 21 and magnetic head slider 23 in contact with these parts. Stationary converter 21 and surface of magnetic head slider 23 are held substantially parallel by a force of about 14 gr. applied to magnetic head slider 23 by torsion spring 27 or 30. When magnetic disk 1 is sandwiched between stationary converter 21 and magnetic head slider 23, the initial sagging of disk 1 is corrected, and thus stable state of contact can be maintained.

This structure, however, has the following deficiencies.

(i) With an air bearing effect provided by entry of air into the space between the magnetic disk and magnetic head with rotation of the magnetic disk, the pressure of air in the space between the magnetic disk and head slider becomes higher than atmospheric pressure (i.e., becomes positive) during operation. A gap is thus liable to be produced. Therefore, it is necessary to increase the force of the torsion spring applied to the magnetic head.

(ii) At the time of the start of the magnetic disk, this force entirely constitutes the pressure contact with the disk, and the disk is thus liable to be damaged. In addition, at the time of the start great frictional force is produced to increase power consumption.

(iii) The pressure of contact between the disk and head is determined by the equilibrium between the force applied by the torsion spring and air pressure provided by the effect of air bearing. This equilibrium is changed instantaneously by initial deformation and posture of the disk and external disturbances such as vibrations of the disk. The contact pressure distribution, therefore, can be difficultly stabilized and changed greatly during operation.

In other words, the stability of contact between the magnetic disk and magnetic head slider is low, and therefore high local contact pressure is liable to be produced in the contact section to reduce the reproduction output from the magnetic disk (or result in reduction of magnetization due to pressure application) and, in a worst case, cause damage to the disk.

A different example of the apparatus of this type is disclosed in Japanese Patent Disclosure No. 1-94563, and it is widely used in the field of electronic still image recording apparatuses. To overcome the above drawback, the above apparatus is provided with a head support such that the air pressure in the neighborhood of the magnetic head is lower than atmospheric pressure (i.e., negative) as a method of supporting the head. The construction and operation of the apparatus will now be described. FIG. 11 is a sectional view showing the apparatus, FIG. 12 is a plan view showing the same, and FIG. 13 is a sectional view for explaining the operation. Referring to the Figures, designated at 41 is a magnetic head support, and at 42 a magnetic head supported by magnetic head support 41. Magnetic head support 41 has first annular projection 41a and second projection 41d defining inner mounting hole 41c and serving as negative pressure generation means. First recessed portion 41b is formed between first and second projections 41a and 41d, and small second recessed portion 41e is formed between gap formation portion 42a of magnetic head 42 and second projection 41d. Gap formation portion 42a of magnetic head 42 is upwardly inserted in mounting hole 41c and secured in position projected slightly from the top surface of second projection 41d.

In operation, as shown in FIG. 13, as magnetic disk 1 is rotated at high speed in the direction of arrow A, negative pressure is produced in first and second recessed portions 41b and 41e. The disk is thus sucked against the top of magnetic head support 41 and deformed after the recessed and projected shape of magnetic head support 41. With positional relation between first projection 41a and first recessed portion 41b negative pressure is produced in first recessed portion 41b after the Bernoulli Law, and magnetic disk 1 is led to gap formation section 42a of magnetic head 42 with its height determined by second projection 41d. Thus, in gap formation section 42a magnetic disk 1 is deformed along the radius of curvature of gap formation section 42a, and magnetic head 42 thus can be in stable contact with magnetic disk 1.

However, the above structure has the following drawbacks.

(i) Since the magnetic head is supported in projected state in the recessed portions, the control of extent of projection is very difficult. In addition, the contact areas of the magnetic head and medium are very small while the contact pressure is comparatively high, the magnetic head is readily worn out. Therefore, the extent of projection is variable, and the life of the head is short.

(ii) The contact pressure is liable to cause damage to the magnetic disk. In addition, the magnetic disk undergoes comparatively large local deformation in the neighborhood of the magnetic head, and repetition fatigue thus readily takes place. For this reason, data omission or the like is liable to be increased to deteriorate performance concerning reliability which is important for the recording and reproducing apparatus.

(iii) Since the head and disk are brought into contact with each other with deformation of the disk caused by the negative pressure effect, it is essentially difficult to make recording and reproduction on both sides of the disk. This is so because if a magnetic head support is provided on each side of magnetic disk, negative pressures generated on both sides of the disk cancel each other, making it difficult to obtain deformation of the disk in conformity to the radius of curvature of gap formation section 42a.

As shown above, with the prior art apparatus of the positive pressure type structure, in which magnetic disk and head slider are brought into contact with each other by urging the disk, a pressure for urging the magnetic head against the magnetic disk is necessary. At the time of the start, this pressure constitutes a contact pressure on the disk and is liable to cause damage to the disk. In addition, the contact between the magnetic disk and magnetic head slider is poorly stable, thus leading to reduction of the reproduction output and, in a worst case, causing damage to the disk. With the prior art apparatus of the negative pressure type, in which the magnetic disk is sucked, the disk undergoes comparatively large local deformation in the neighborhood of the magnetic head, and repetition fatigue thus readily takes place, leading to reduction of the reliability and also to such problem as impossibility of recording and reproduction on both sides of the disk.

SUMMARY OF THE INVENTION

The present invention has been intended to solve the above problems inherent in the prior art, and its object is to provide a magnetic head slider, which has a negative pressure type structure and nevertheless permits recording and reproduction on both sides of a magnetic disk as well as having high reliability, permitting high speed high density recording, permitting size reduction of the magnetic recording and reproducing apparatus and being excellent in the mass productivity, and also a magnetic head slider support mechanism, which is capable of ready adjustment at the time of double side magnetic recording and reproduction.

According to the invention, there is provided a magnetic head slider, which has its surface in frictional contact with the magnetic recording medium provided with a smooth surface portion and a coarse surface portion with a plurality of grooves or recesses so that the mean gap with respect to the medium is smaller at the air stream inlet end than that at the outlet end, the magnetic recording medium being thereby sucked and held in contact with the magnetic head slider by a negative pressure generated with relative movement of it and magnetic head slider during recording and reproduction.

The smooth and coarse surface portions are provided respectively adjacent to the inlet and outlet ends of the surface in frictional contact with the magnetic recording medium.

In addition, the smooth surface portion and top of the coarse surface portion lie in the same plane.

According to another invention in the present application, there is also provided a magnetic head slider, which has its surface in frictional contact with the magnetic recording medium provided with a step such that the gap with respect to the medium is smaller on the side adjacent to the air stream outlet end than that on the side adjacent to the air stream inlet end, the magnetic recording medium being thereby sucked and held in contact with the magnetic head slider by a negative pressure generated with relative movement of it and magnetic head slider during recording and reproduction.

According to the invention, there is further provided a magnetic head slider support mechanism, in which a pair of magnetic head sliders like those noted above are provided on opposite sides of magnetic disk, one of these magnetic head sliders being supported by an elastic member, the magnetic disk and magnetic head slider being relatively moved to be in contact with each other for recording and reproduction through sucking by a negative pressure generated with rotation of the magnetic disk.

According to the invention, the magnetic recording medium is supported by the entire plane surface constituted by the smooth surface portion and top of the coarse surface portion with a contact pressure corresponding to the sucking force. Thus, it can slide along the magnetic head sliders without bending or other deformation but substantially in a plane state. Further, the load of contact is produced by a negative pressure obtained due to an air bearing effect provided between the magnetic recording medium and slider. Thus, there is provided an automatic contact pressure control function to provide a predetermined contact pressure to provide a characteristic of contact between magnetic recording medium and magnetic head slider, which is stable irrespective of external disturbances or adjustment errors. Further, since the air bearing effect is utilized, in the stationary state of the magnetic recording medium the contact pressure is about as much as is based on the weight of the medium alone. Thus, no unnecessary load torque is produced at the time of the start. Therefore, the power consumption can be low, and it is possible to reduce size of the apparatus. Further, the actual contact area with the magnetic recording medium is small because of the presence of the coarse surface portion, and it is possible to avoid stiction/adhesion of the magnetic head slider and magnetic recording medium to each other in the stationary state of the medium.

According to a further invention in the present application, a pair of magnetic head sliders are each provided on each side of magnetic recording medium to cancel bending deformation generated at the stepped portion by stiction/adhesion produced by negative pressure, and thus it is possible to hold the magnetic recording medium substantially in a plane state.

Further, by providing a pair of negative pressure type magnetic head sliders on opposite sides of magnetic disk 5 and supporting at least one of these sliders with an elastic member, it is possible to attain readily adjustable double side magnetic recording.

The above and other objects, features and advantages of the invention will become more apparent from the following description when taken in conjunction with the accompanying drawings.

BRIEF DESCRIPTION O THE DRAWINGS

Figure 11:
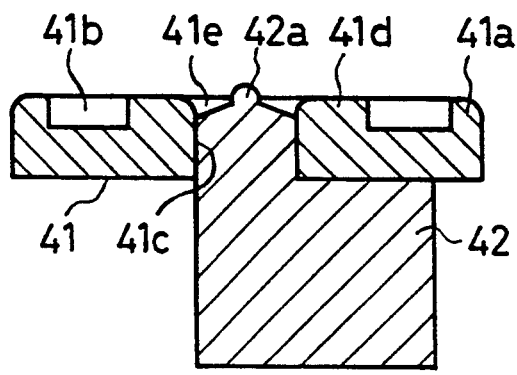
Figure 12:
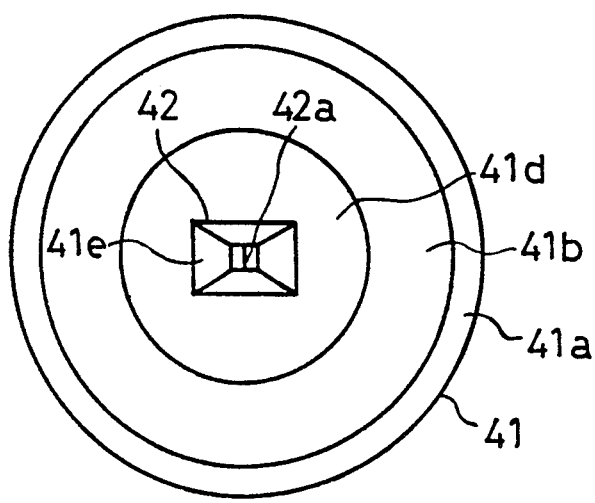

FIGS. 8(a) to 8(j) are plan views showing examples of the configuration of a frictional surface of the magnetic head slider according to the invention;

FIG. 9 is a plan view showing a prior art structure;

FIG. 10 is a side view, partly in section, showing the same prior art structure;

FIG. 11 is a sectional view showing another prior art structure;

FIG. 12 is a plan view showing the same prior art structure; and

Figure 13:
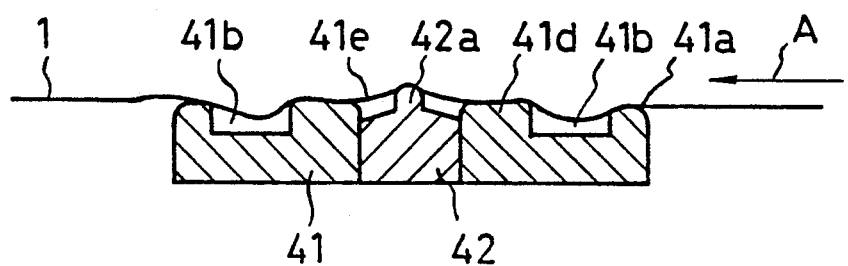

FIG. 13 is a sectional view for explaining the operation of the same prior art structure.

DESCRIPTION OF THE PREFERRED EMBODIMENTS

Figure 1:
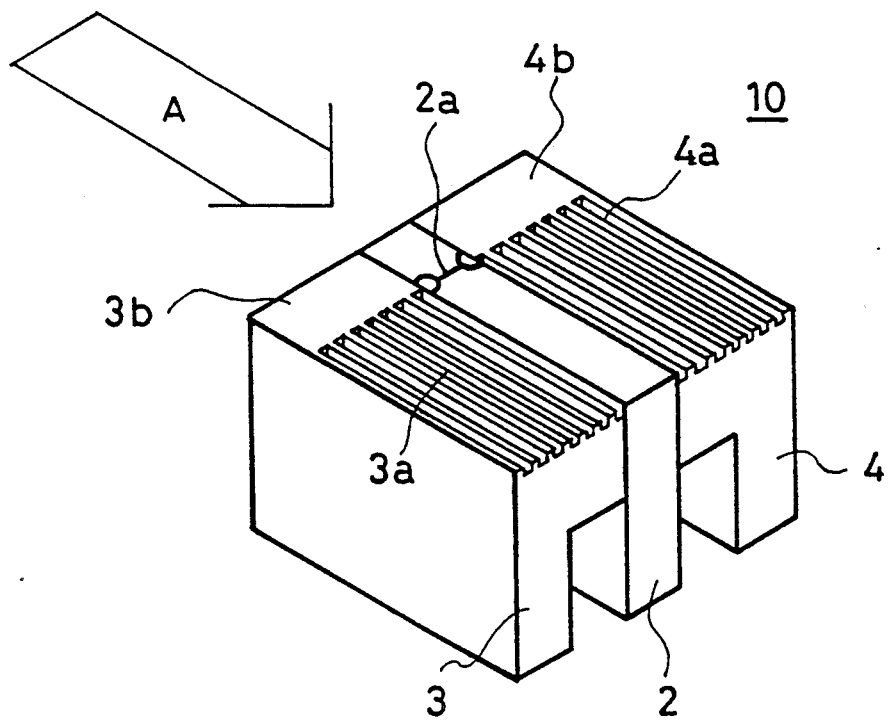
FIG. 1 is a schematic perspective view showing one embodiment of the magnetic head slider according to the present invention.

FIG. 1 is a perspective view showing one embodiment of the magnetic head slider according to the invention. Designated at 2 is a magnetic head core, which includes a R/W gap section 2a for recording and reproducing data on and out of a magnetic disk and a coil (not shown) for generating and detecting a magnetic field in R/W gap section 2a. First and second holders 3 and 4 are bonded to the opposite sides of head core 2 in a sandwiching relation thereto. These holders have their surfaces in frictional contact with the magnetic disk with respective coarse surface portions 3a and 4a adjacent to an air stream outlet end and smooth surface portions 3b and 4b adjacent to an air stream inlet end. Arrow A indicates the direction of movement of the magnetic disk.

The holders are usually made of ceramics in view of the durability and character of friction with magnetic disk 1. In this embodiment, coarse surface portions 3a and 4a extend parallel to the direction of movement of magnetic disk 1 and have a plurality of rectangular grooves. The pitch of grooves is suitably less than about several times the thickness of magnetic disk 1, desirably a fraction of this value. It is desirably as small as possible, but it is determined by consideration of the efficiency and accuracy in manufacture. In this case, it is set to one-fifth of the magnetic disk thickness.

The coarseness of smooth surface portions 3b and 4b is set to be far low compared to coarse surface portions 3a and 4a and substantially the same as that of magnetic head core 2.

Designated at 10 is a magnetic head slider, which comprises magnetic head core 2 and first and second holders 3 and 4. The top of coarse surface portions 3a and 4a of first and second holders 3 and 4 is set substantially to form a plane with the top of magnetic head core 2 and smooth surface portions 3b and 4b of first and second holders 3 and 4.

To manufacture this magnetic head slider 10, the grooves of coarse surface portions 3a and 4a of first and second holders 3 and 4 are set to be slightly deeper than a predetermined depth. Coarse surface portions 3a and 4a may be readily formed by machining or various etching processes. First and second holders 3 and 4 are bonded to magnetic head core 2 in a sandwiching relation thereto. The frictional surface of magnetic head slider 10 thus produced is then polished to form a top plane surface.

Figure 2A:
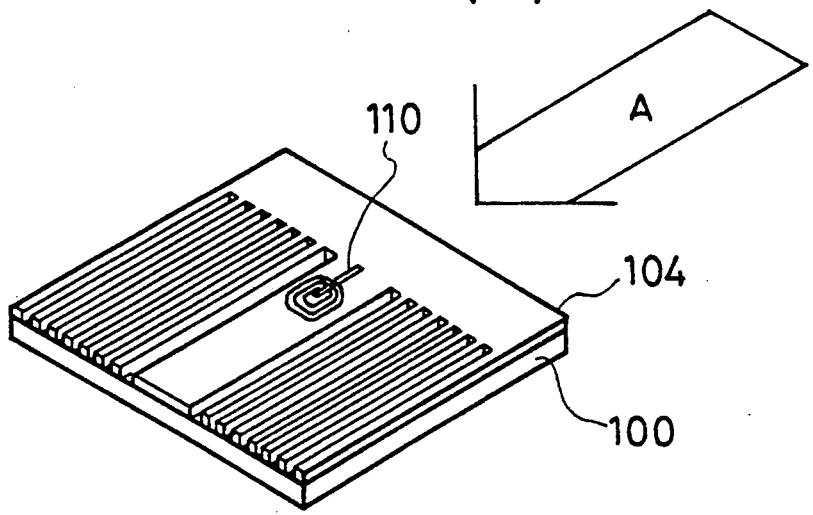
FIG. 2(a) is a schematic perspective view showing further another embodiment of the magnetic head slider according to the present invention.
Figure 2B:
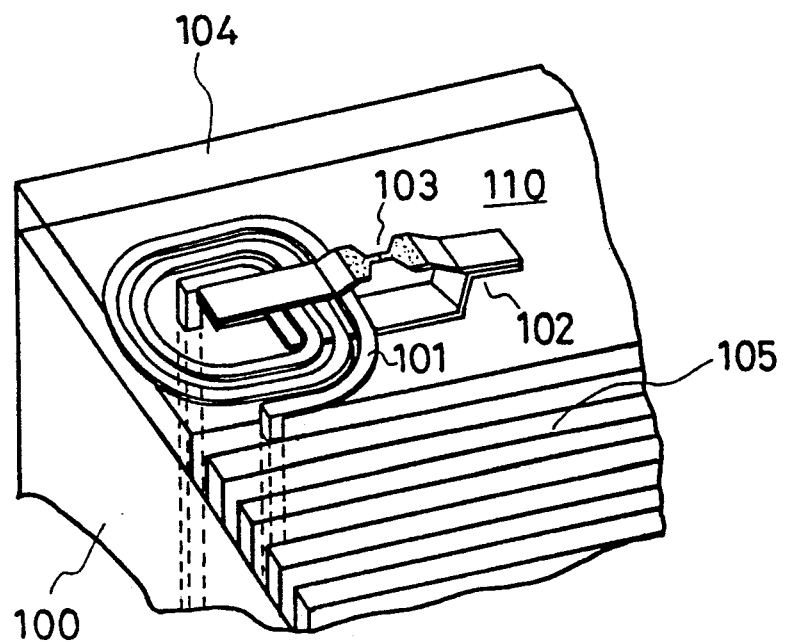
FIG. 2(b) is an enlarged-scale perspective view of the above.
Figure 3:
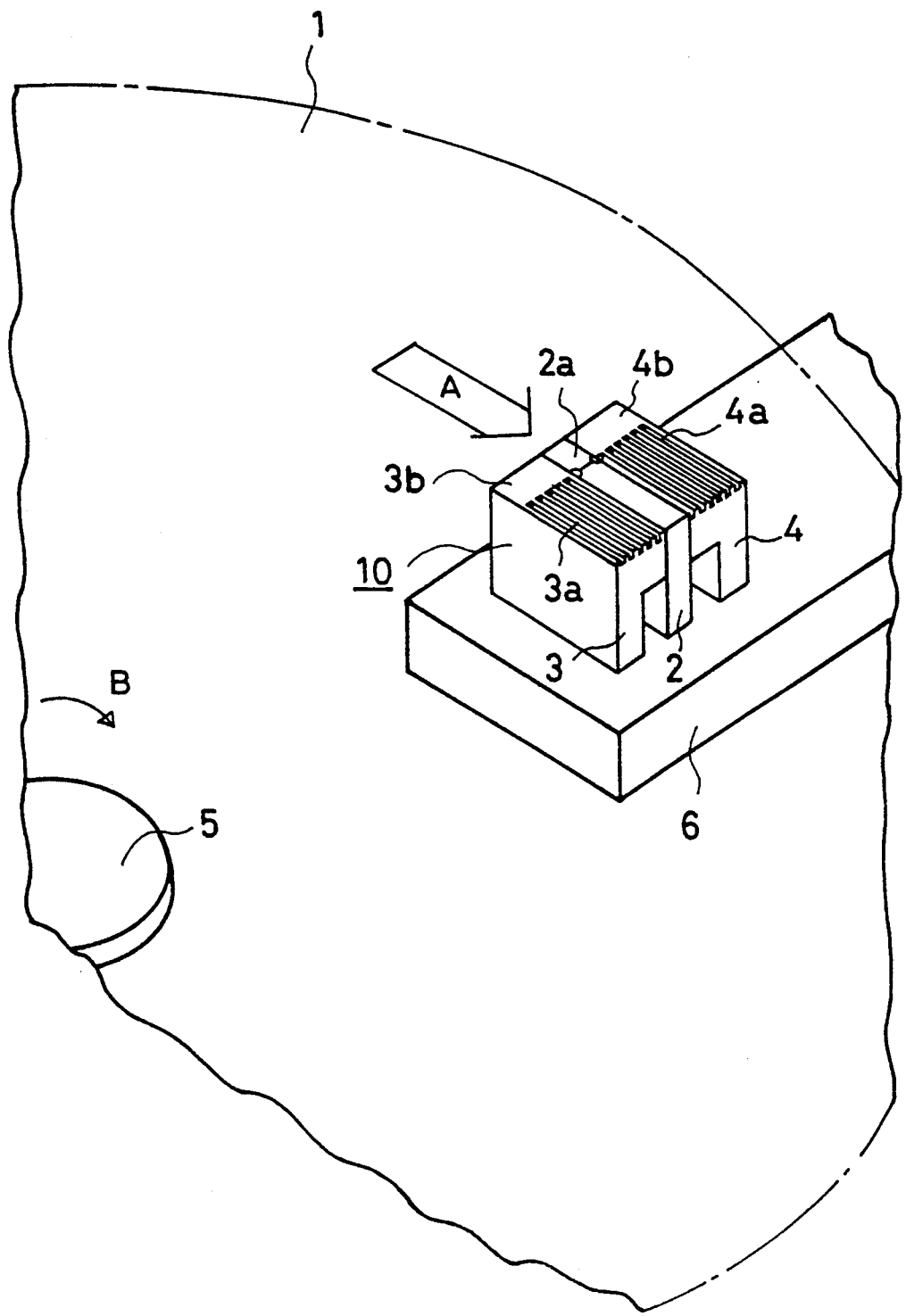
FIG. 3 is a perspective view showing a method of supporting the magnetic head slider shown in FIG. 1.

Now, the construction and method of supporting the magnetic head slider in case of performing recording and reproduction with respect to a single side of magnetic disk 1 will be described with reference to a perspective view of FIG. 3 showing the magnetic head slider looked from the side of and through the magnetic disk. Referring to FIG. 2, designated at 1 is a magnetic disk having a central portion thereof secured in position by disk clamp 5 and rotated in a direction of arrow B. Magnetic head slider 10 is supported by carrier 6 such that its frictional surface substantially lies in the plane of securement of disk clamp 5. This structure applies to a recording and reproducing apparatus using a magnetic tape instead of magnetic disk, and the same effects can be obtained by supporting the magnetic head slider in a secured position with a carrier.

The operation will now be described. When magnetic head slider 10 and magnetic disk 1 are moved relatively at a relative velocity V, a corresponding air stream is produced. This effect is usually called air bearing effect. This air bearing effect acts as air pressure distribution which is determined by the distribution of gap between magnetic disk 1 and magnetic head slider 10. The air pressure acts as force between magnetic disk 1 and magnetic head slider 10. An example of positive utilization of such effect is a hard disk apparatus. In this apparatus, the shape of magnetic head slider 10 is set such that the air pressure is a pressure higher than atmospheric pressure (i.e., positive pressure) so that magnetic head slider 10 is floated as a whole from magnetic disk 1.

In this embodiment, on the other hand, the air pressure is set to a pressure lower than atmospheric pressure (i.e., negative pressure). As equation collectively expressing these air bearing effects, an equation presented by Burgdorfer from considerations of a molecule mean free path of air (disclosed in Transactions of the ASME, Journal of Basic Engineering, March, 1959, pp. 94–100) well expresses the phenomena. This equation is, taking x axis for the direction of the relative velocity of medium, $$\frac{\partial}{\partial X}\left[PH^3(1 + 6aM/PH)\frac{\partial P}{\partial X}\right] + \tag{1}$$

$$\frac{\partial}{\partial Y}\left[PH^3(1 + 6aM/PH)\frac{\partial P}{\partial Y}\right] = \Lambda\frac{\partial PH}{\partial X}$$

where P represents the non-dimensional pressure (p/p$_a$) with reference to atmospheric pressure p$_a$, H the non-dimensional gap (h/h$\phi$) between the magnetic disk and magnetic slider with reference to typical gap h$\phi$, a a wall surface correction coefficient, M the Knudsen number, and $\Lambda$ the compressibility constant.

Further, Mitsuya et al provides a theorem in case where magnetic head slider 10 has surface roughness (as disclosed in Transaction of the ASME, Journal of Tribology, July 1989, Vol. 111, pp. 495–503). According to this theorem, the surface roughness of magnetic head slider 10 is expressed as the following macroscopic average gap H$_{AVE}$, indicating substantially an equivalent effect to that of H in equation (1).

$$\begin{aligned} H_{AVE} &= \alpha H + (1 - \alpha) H \\ H^2_{AVE} &= \alpha H^2 + (1 - \alpha) H^2 \\ H^3_{AVE} &= \alpha H^3 + (1 - \alpha) H^3 \end{aligned} \tag{2}$$

where and respectively represent the arithmetic and harmonic means values of the gap. In other words, $$H = \frac{1}{\Delta X \Delta Y}\int_0^{\Delta Y}\int_0^{\Delta X} H dX dY \tag{3}$$

$$H^2 = \frac{1}{\Delta X \Delta Y}\int_0^{\Delta Y}\int_0^{\Delta X} H dX dY$$

$$H^3 = \frac{1}{\Delta X \Delta Y}\int_0^{\Delta Y}\int_0^{\Delta X} H^3 dX dY$$

$$H = \int_0^{\Delta Y}\int_0^{\Delta X}\frac{1}{H^2}dXdY / \int_0^{\Delta Y}\int_0^{\Delta X}\frac{1}{H^3}dXdY \tag{4}$$

$$H^2 = \Delta X \Delta Y / \int_0^{\Delta Y}\int_0^{\Delta X}\frac{1}{H}dXdY$$

$$H^3 = \Delta X \Delta Y / \int_0^{\Delta Y}\int_0^{\Delta X}\frac{1}{H^3}dXdY$$

H represents the gap distribution inclusive of the surface roughness distribution, and $\alpha$ is the gap mixture ratio and $0 \leq \alpha \leq 1$. As criteria, $\alpha = 0.0$ when the surface roughness perpendicularly intersects with the x axis;

$\alpha = 0.5$ when the surface roughness is isotropic; and $\alpha = 1.0$ when the surface roughness is parallel to the x axis.

The invention is predicated in this guide principle. More specifically, the surface roughness of the frictional surface of magnetic head slider 10 is varied with the provision of the coarse and smooth surface portions such as to obtain an air pressure characteristic equivalent to a desired gap characteristic, and magnetic disk 1 is supported on the top of the coarse and smooth surface portion so that the disk can be moved while it is substantially maintained in a plane state.

Figure 4:
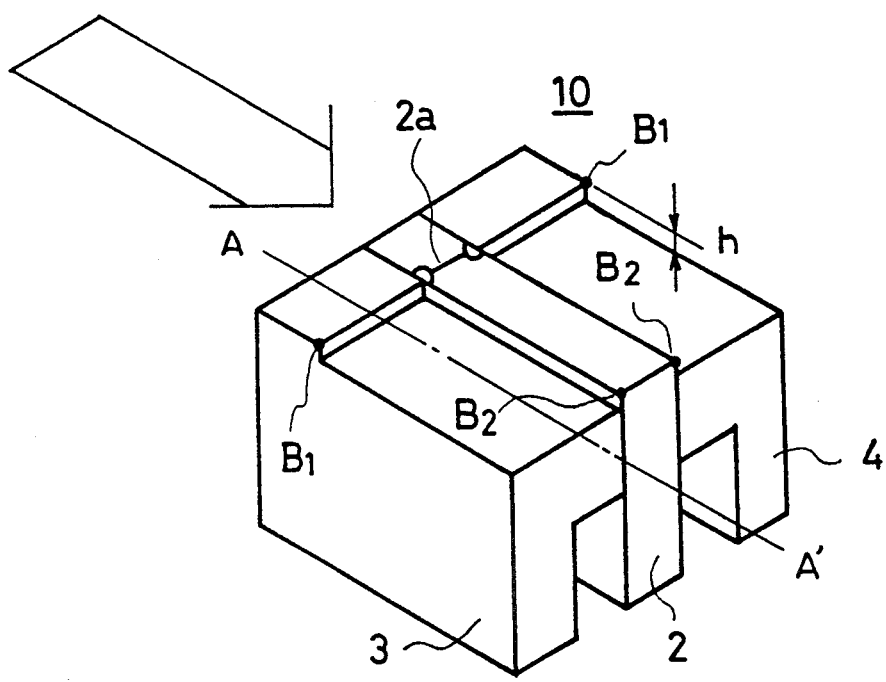
FIG. 4 is a schematic perspective view showing another embodiment of the magnetic head slider according to the present invention.
Figure 5:
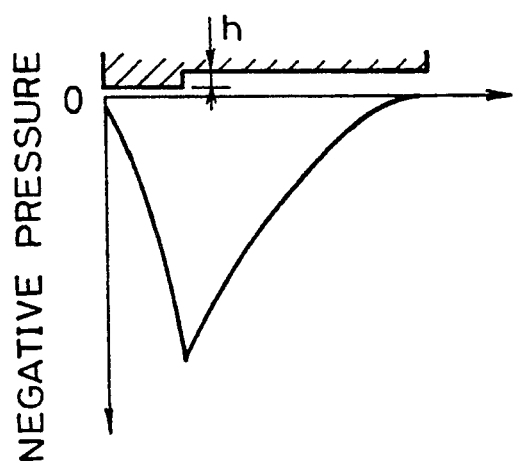
FIG. 5 is a pressure distribution diagram of the same embodiment.

In effect, by relatively moving magnetic head slider 10 as one embodiment of the invention in a state opposing magnetic disk 1 as shown in FIG. 3, it is possible to obtain substantially the same pressure characteristic as that of a land step type magnetic disk slider shown in a schematic perspective view of FIG. 4, a a different embodiment of the invention, i.e., of a land step type slide bearing. At this time, step h as land step of the frictional surface of the slider can be calculated from equations (2) with $\alpha = 1.0$ for the grooves of the coarse surface portion extend in the direction of movement of the medium. Equations (2) do not have any harmonic mean term, and obviously only arithmetic mean terms may be considered. In effect, the pressure distribution a section along line A—A' of magnetic head slider 10 shown in FIG. 4, which has a gap distribution equivalent to that of the slider shown in FIG. 1, is roughly as shown in FIG. 5. As shown, negative pressure is generated, and magnetic disk 1 is sucked to be brought into contact with magnetic head slider 10. With the land step type slider shown in FIG. 4, magnetic disk 1 undergoes bending deformation at this time about points B$_1$ and B$_2$ of FIG. 4 as support points due to stiction/adhesion force provided by the negative pressure. With magnetic head slider 10 shown in FIG. 1, however, magnetic disk 1 is supported by the entire plane surface constituted by the top of coarse surface portions 3a and 4a and smooth surface portions 3b and 4b with a contact pressure corresponding to the stiction/adhesion force. Thus, magnetic disk 1 never undergoes any bending deformation but can be moved while it is held in a plane state. Therefore, unlike the slider shown in FIG. 4, there is no possibility that magnetic disk 1 is damaged by great contact pressure or bending stress generated at point B$_1$ or B$_2$.

Further, unlike a system, to which an external load is exerted, a contact load is produced by negative pressure due to air bearing effect produced between magnetic head slider 10 and magnetic disk 1, and therefore an automatic contact pressure control function is provided to provide a predetermined contact pressure It is thus possible to obtain a characteristic of contact between magnetic disk and magnetic head slider 10, which is stable irrespective of external disturbances or adjustment errors. Further, since air bearing effect is utilized, in the stationary state of magnetic disk 1 the contact pressure is as much as that due to the weight of the disk alone. Thus, magnetic disk 1 can be started without unnecessary load torque, and it is possible to provide an apparatus consuming low power.

Further, since magnetic head slider 10 has coarse surface portions formed with grooves, the actual contact area of the disk is small enough to avoid stiction/adhesion of magnetic head slider 10 and magnetic disk 1 to each other in the stationary state of the disk.

The other embodiment of the magnetic head slider shown in FIG. 4 is inadequate for single side recording and reproduction on and from magnetic disk 1 because in this case the disk undergoes bending deformation as noted before. However, when performing double side recording and deformation, negative pressures generated on both sides of magnetic disk 1 cancel each other, and therefore the disk never undergoes any bending deformation but is moved while it is held in a plane state. This magnetic head slider system is thus suited for double side recording and reproduction, while it is simple in construction and can be readily fabricated compared to the slider having coarse surface portions 3a and 4a as shown in FIG. 1.

As has been shown, according to the invention by utilizing the mean gap method it is possible to construct a magnetic head slider corresponding to a given shape of land step type or taper flat type by using smooth and coarse surface portions such that the slider has a plurality of different profiles with tops thereof lying in the same plane. It is thus possible to provide a magnetic head slider, which permits movement of a flexible medium without undergoing any bending deformation but in a plane state at all time.

Figure 6:
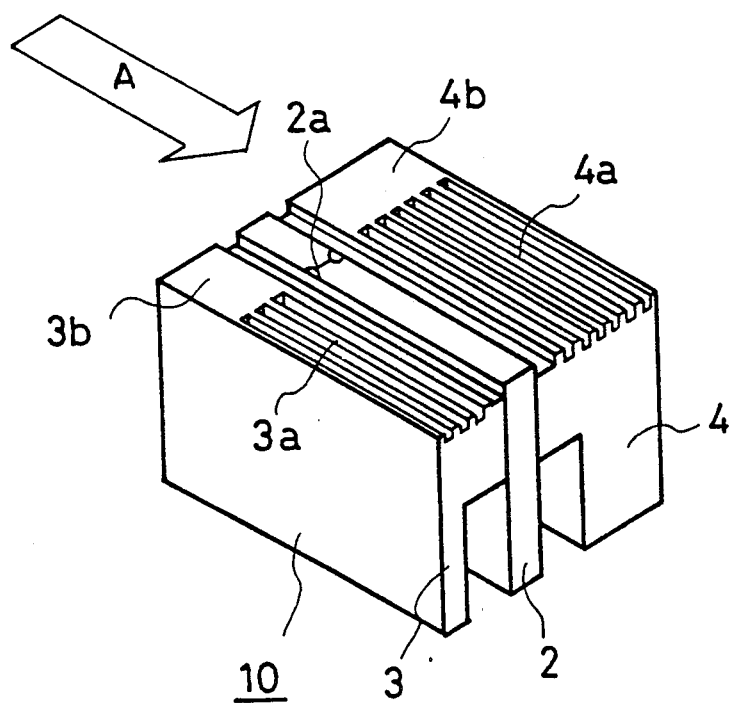
FIG. 6 is a schematic perspective view showing a further embodiment of the magnetic head slider according to the invention.

FIG. 6 is a schematic perspective view showing a further embodiment of magnetic head slider 10. This embodiment overcomes the drawback in the second prior art example (of negative pressure type) that double side use of magnetic disk is impossible. Referring to the Figure, magnetic head core 2 is the same as that shown in FIG. 1 except for that it is set at a position slightly deviated from the center of magnetic head slider 10. This structure is effective for avoiding crosstalk when recording or reproducing signal. If it is possible to solve the problem of crosstalk inherent in the structure, in which magnetic disk 1 is sandwiched between opposite side magnetic head sliders 10 with head core gap positions thereof close to each other, by magnetic shield or like means, the magnetic gaps may be located in any positions to attain the object of the invention.

Figure 7:
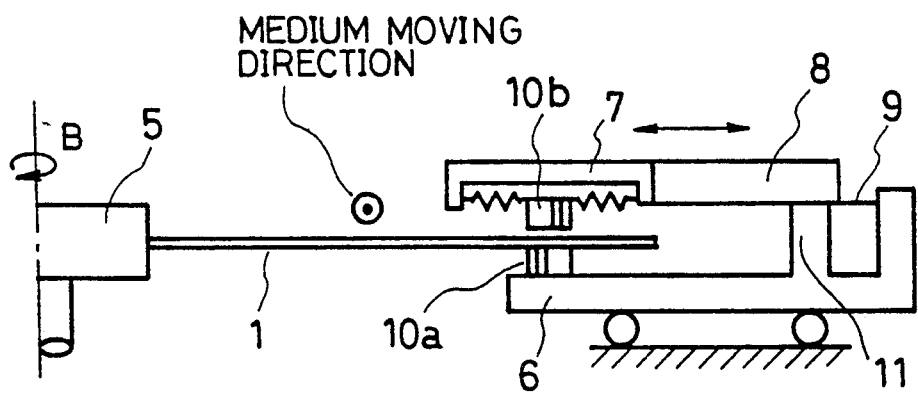
FIG. 7 is a schematic sectional view showing one embodiment of the magnetic head slider support mechanism according to the invention.

FIG. 7 is a side sectional view showing an embodiment of the magnetic head slider support mechanism according to the invention with magnetic disk 1 in a stationary state. Designated at 6 is a carrier, which is supported by a carrier drive mechanism (not shown) such that it is movable in the radial direction of magnetic disk 1. First magnetic head slider 10a is securely supported on carrier 6 near the free end thereof. Second magnetic head slider 10b is provided on the side of magnetic disk 1 opposite first magnetic head slider 10a. It is supported at one end of suspension 7, which has three degrees of freedom in two rotational directions and directions toward and away from magnetic disk 1. Suspension 7 is supported by arm 8. Arm 8 has its free end opposite suspension 7 supported via leaf spring 9 by a free end of carrier 6 opposite the free end, at which first magnetic head slider 10a is securely supported. Arm 8 is held by arm stopper 11 connected to carrier 6. Suspension 7 has low enough rigidity that in the stationary state of magnetic disk 1 its spring force hardly contributes to the contact of first and second head sliders 10a and 10b with magnetic disk 1. The gap between first and second magnetic head sliders 10a and 10b is set to be very slightly greater than the thickness of magnetic disk 1. However, the characteristics according to the invention are never changed when first and second magnetic head sliders 10a and 10b are caused to be in contact with magnetic disk 1 by very slight contact load due to external disturbances of the assembling accuracy or posture of the apparatus itself.

The operation will now be described. When magnetic disk 1 shown in FIG. 7 is rotated, negative pressure is produced between each magnetic head slider and magnetic disk, and magnetic disk 1 is first sucked to first magnetic head slider 10a to be in contact therewith while being held substantially in a plane state. Then, by negative pressure produced between magnetic disk 1 and second magnetic head slider 10b, second magnetic head slider 10b is sucked to extend along the plane surface provided by magnetic disk 1. Second magnetic head slider 10b is supported by suspension 7, which has three degrees of freedom in the opposite rotational directions and directions toward and away from magnetic disk 1. Since the rigidity of suspension 7 is far low compared to the rigidity of air film based on the air bearing effect, a substantially parallel plane is maintained with the plane formed by first magnetic head slider 10a as reference plane to sandwich magnetic disk 1. Thus, R/W gap portions (not shown) formed on first and second magnetic head sliders 10a and 10b are held in close contact with magnetic disk 1. It is thus possible to obtain very stable recording and reproduction of information on and from magnetic disk 1.

In the case of the system disclosed in Japanese Patent Publication No. 58-15866, a contact pressure of about 14 gr. is provided in the stationary state of the disk from some spring force, and when the disk is rotated this load constitutes a load of contact between magnetic disk 1 and magnetic head slider. In contrast, with this embodiment the spring force of suspension 7 scarcely contributes to the force of contact between the magnetic disk and magnetic head slider when the disk is either stationary or rotating, but the force of contact between the magnetic head and magnetic disk is generated by negative pressure due to fluid dynamic effect of air based on relative movement of the magnetic head and magnetic disk. In other words, suspension 7 in this embodiment has a main role of absorbing geometric assembling errors to provide for uniform contact of the magnetic slider with the magnetic head by fluid force during rotation of the disk, and it never has any purpose of providing contact load. This structure of the embodiment has the following novel advantages over the prior art.

(i) An automatic contact pressure control mechanism works due to air pressure, and thus it is possible to obtain stable contact between the magnetic disk and magnetic slider with respect to external disturbances and control errors.

(ii) For this reason, it is possible to set a lower contact pressure than that provided by the spring force in the prior art and thus reduce power consumption of the motor when the disk is rotated.

(iii) When the disk is stationary, no air bearing effect is provided, and thus the force of contact between the magnetic disk and magnetic head slider is very low. Thus, the motor start torque can be reduced to contribute to the reduction of the apparatus scale and power consumption.

(iv) The actual contact areas of the magnetic head slider and magnetic disk can be reduced due to the surface roughness, and thus it is possible to provide a highly reliable apparatus which can avoid the phenomenon of absorption.

(v) The magnetic disk can be moved while it is held in a substantially horizontal state. It is thus possible to prevent the magnetic disk from exercising bending fatigue or receiving high contact pressure.

In the above embodiment, the coarse surface portions 3a and 4a are provided rectangular grooves extending parallel to the running direction of the magnetic disk. However, it is possible to expect similar function with coarse surface of any shape by using the gap averaging process noted above. Generally, it is possible to use coarse surfaces having shapes randomly formed with grooves or recesses of shapes including sinusoidal curves and harmonic components thereof. Similar effects can be expected by setting mean gap value based on equations (2) to (4) as design value. So far, no mention has been made of the bottom portion, in the grooves for instance, of coarse surface portions 3a and 4a. However, by plane surface polishing the entirety of magnetic head slider 10 after coating a low activity material such as Teflon, not only similar function can be expected, but also it is possible to prevent dust entering the gap between the bottom of coarse surface portions 3a and 4a and magnetic disk 1, in which gap the rate of air flow is high, from attaching to the bottom of coarse portions 3a and 4a, thus preventing the deterioration of negative pressure generation characteristics and damage to magnetic disk 1 due to dust attachment or like course.

In this embodiment, first magnetic head slider 10a is securely supported on a carrier. However, even if it is supported on a suspension like second magnetic head slider 10b, the magnetic disk and head slider can be in contact with each other in a plane state, and thus similar effects can be obtained. As the degrees of freedom of the suspension of the combination of two magnetic head sliders 10a and 10b, it is necessary to secure at least three degrees of freedom for ensuring uniform contact of the plane surfaces of first and second magnetic head sliders 10a and 10b via magnetic disk 1, and similar effects may be obtained by increasing the degrees of freedom.

Figure 8A:
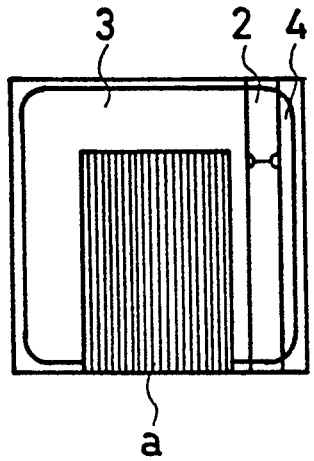
Figure 8B:
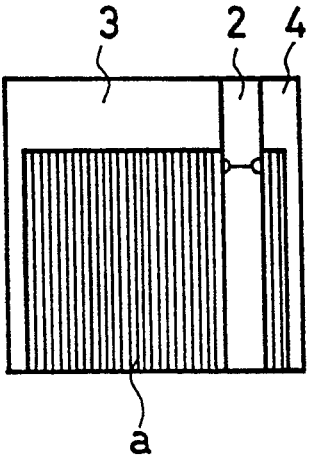
Figure 8C:
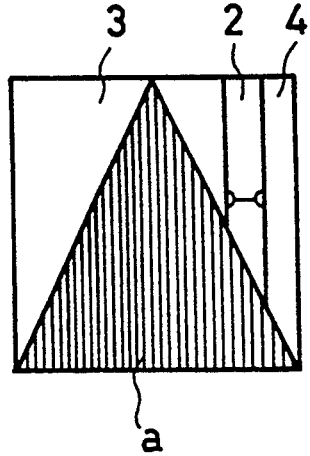
Figure 8D:
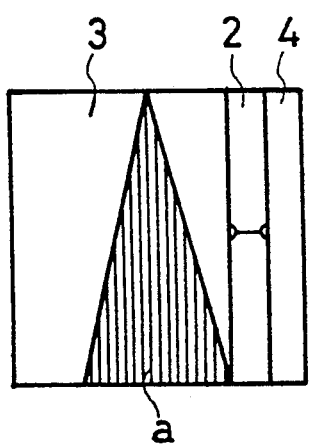
Figure 8E:
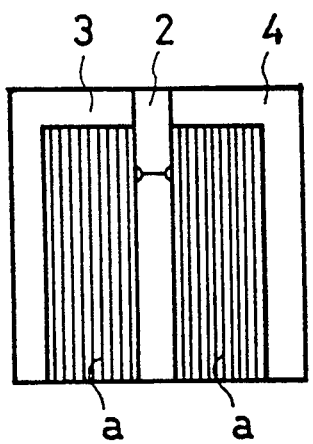
Figure 8F:
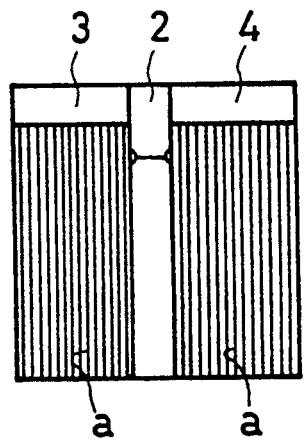

The arrangement of the plane and coarse surface portions of the frictional surface of the magnetic head sliders or the low level surface formed with the provision of a step are conceivable variously, and various combinations are possible. It is possible to obtain similar effects with a structure, in which the mean gap on the side of the inlet end of magnetic disk 1 is smaller than the mean gap on the side of the outlet end such that negative pressure is generated consequently with the mean gap calculated by equations (2) to (4). FIGS. 8(a) to 8(j) show combination examples. FIG. 8(a) shows a coarse surface portion or a low level surface portion. In either case, similar effects can be expected.

In the above embodiment of the magnetic head slider, the holder and core are bonded together. However, recent method of manufacturing magnetic head sliders positively utilizes techniques of semiconductor manufacture such as etching, lithography and spattering for simultaneously forming a plurality of slider shapes including electromagnetic converters on a substrate. FIG. 2 shows an example of magnetic head slider formed in this way. FIG. 2(a) is a schematic perspective view and FIG. 2(b) is an enlarged-scale perspective view. In this magnetic head slider, protective film 104 of $AL_2O_3$ or $S_iO_2$ is formed on substrate 100 together with electromagnetic converter 110 including coil 101, core 102 and gap 103. Grooves 105 may be formed by removing portions of protective film 104 by means of etching. According to the invention, similar effects can be obtained with such slider. In addition, grooves can be formed easily, which is greatly effective for cost reduction.

The above explanation concerned with the utility of the invention to a flexible magnetic disk apparatus. However, the invention of course may be utilized as well for such apparatuses as VTR and DAT which perform contact recording using flexible recording media.

As has been described in the foregoing, according to the invention a magnetic head slider has its frictional surface with respect to a magnetic recording medium provided with a smooth surface portion and a coarse surface portion having a plurality of grooves or recesses such that the mean gap with respect to the recording medium is smaller on the side of air inlet end than on the side of air outlet end, and when performing recording or reproduction the magnetic recording medium is sucked into contact with the magnetic head slider by negative pressure generated with relative movements of the magnetic recording medium and magnetic head slider. Thus, the invention is applicable to double side magnetic recording and reproduction, and it is possible to obtain a magnetic head slider, which is highly reliable, permits high speed high density recording, permits size reduction of magnetic recording and reproducing apparatus and is excellent in productivity.

Further, by providing a step in the frictional surface with respect to the magnetic recording medium such that the gap with respect to the magnetic recording medium is smaller on the side of air inlet end than on the side of air outlet end, the construction of the magnetic head slider is simplified, and manufacture is facilitated.

Further, a pair of magnetic head sliders are each provided on each side of the magnetic disk, with at least one of them supported with an elastic member, and the magnetic disk and magnetic head is brought into contact with each other for recording or reproduction with relative movement of one of them caused by stiction/adhesion by negative pressure generated with rotation of the magnetic disc. It is thus possible to obtain a magnetic head slider support mechanism, which is capable of ready adjustment for performing double side magnetic recording or reproduction.

What is claimed is:

1. A magnetic head slider having a magnetic head in contact with a magnetic recording medium, said head having a plurality of slots aligned parallel to a direction of movement of said recording medium, said head having different shapes adjacent to air stream inlet and outlet ends such that a mean gap with respect to said magnetic recording medium is smaller adjacent to the air stream inlet end than adjacent to air stream outlet end, whereby when performing recording or reproduction, said magnetic recording medium, is sucked to be in contact with said magnetic head slider by a negative pressure generated with relative movement of said magnetic recording medium and magnetic head slider.

2. A magnetic head slider having a magnetic head provided on the side of a surface in frictional contact with a magnetic recording medium, said surface having different shapes adjacent to air stream inlet and outlet end such that the means gap with respect to said magnetic recording medium is smaller adjacent to the air stream inlet end tan adjacent to the air stream outlet end, whereby when performing recording or reproduction said magnetic recording medium is sucked to be in contact with said magnetic head slider by a negative pressure generated with relative movement of said magnetic recording medium and magnetic head slider. where said surface and frictional contact with said magnetic recording medium has a smooth surface portion provided on the side of air stream inlet end and a coarse surface portion provided on the side of air stream outlet end.

3. The magnetic head slider according to claim 2, wherein said smooth and coarse surface surface portions have their tops lying in the same plane.

4. A magnetic head slider having a magnetic head for performing recording and reproduction with respect to a magnetic recording medium, said head being provided with a step with respect to said magnetic recording medium such that a means gap with respect said magnetic recording medium is smaller adjacent to an air stream inlet end than adjacent to an air stream outlet end, said head constructed to provide negative pressure between said magnetic recording medium and said head, whereby said magnetic recording medium is sucked to be in frictional contact with said magnetic head, said negative pressure generated by relative movements of said magnetic recording medium and magnetic head.

5. A magnetic head slider support mechanism for supporting a pair of opposed magnetic head sliders according to claims 1, 2, 3 or 4 provided on one surface and other surface of a magnetic disk, at least one of said magnetic head sliders being supported by an elastic member, whereby said magnetic disk or magnetic head slider are relatively moved into contact with each other for recording or production by a negative pressure generated with rotation of said magnetic disk.

6. The magnetic head slider of claim 1, wherein said magnetic head comprises a core traversing said head in a direction parallel to a direction of movement of said recording media.

7. The magnetic head slider of claim 6, wherein said core is laterally displaced from a center axis of said magnetic head.

8. A magnetic head slider support mechanism for supporting first and second magnetic head sliders on opposing sides of a magnetic disk, comprising:
  a first magnetic head slider secured to a carrier, said carrier having first and second free ends, said slider secured at a first free end of said carrier;
  a second magnetic head slider secured to an arm, said arm supported on said carrier at a second free end of said carrier, said first and second magnetic head sliders having an air inlet portion and an air outlet portion, wherein a mean gap with respect to the magnetic disk is smaller at the inlet end than at the outlet end, so that negative pressure is generated by the relative movement of the magnetic disk in each of the first and second magnetic head sliders.

9. The support of claim 8, wherein said carrier is movable in a direction radial to said magnetic disk.

10. The support of claim 8, wherein said second magnetic head slider is secured to said arm by way of a suspension means.

11. The support of claim 10, wherein said suspension means has three degrees of freedom in a plurality of directions.

12. A magnetic head slider having a magnetic head for performing recording and reproduction with respect to a magnetic recording medium, said head provided with a step with respect to said magnetic recording medium, said head including an air inlet end, an air outlet end, said step extending laterally across said air inlet end, and a core which extends to said air inlet end and traverses said head in a direction parallel to a direction of movement of said recording medium, said head constructed to provide negative pressure between said magnetic recording medium and said head, whereby said magnetic recording medium is attracted to said magnetic head, said negative pressure generated by relative movement of said magnetic recording medium and magnetic head.

13. The magnetic head slider of claim 12, wherein said step provides a mean gap with respect said magnetic recording medium that is smaller adjacent to the air stream inlet end than adjacent of the air stream outlet end.

14. The magnetic head slider of claim 12, wherein said stepped recess terminates in an end surface orthogonal to said magnetic recording medium.

15. The magnetic head slider of claim 12, wherein said core terminates short of said air outlet end.

16. The magnetic head slider of claim 12, wherein said core is literally displaced from a center axis of said magnetic head.

17. The magnetic head slider of claim 12, wherein said stepped recess extends a laterally of said air inlet end.

18. A magnetic head slier system for performing recording and reproduction with respect of a magnetic recording medium which is rotated in a plane, said system comprising:
  a magnetic head slider having an air inlet end and an air outlet end, wherein air passes into a gap region between the magnetic recording medium and the slider when the magnetic recording medium is rotated with respect to the slider, the slier being configured so that the mean gap between the magnetic recording medium and the slider is smaller at the inlet end than at the outlet end which creates negative pressure which draws the slider into contact with the recording medium; and
  a magnetic head slider support mechanism which maintains the slider near the magnetic recording medium in a direction orthogonal to the plane of the magnetic recording medium without providing any substantial force for biasing the slider toward the medium in a direction orthogonal to the plane of the magnetic recording medium.

19. The system of claim 18 further comprising a second magnetic head slider, wherein the first and second magnetic head sliders are positioned on opposite sides of the recording medium so that the recording medium separates the two sliders.

* * * * *